United States Patent
Ballmann et al.

(10) Patent No.: US 10,106,169 B2
(45) Date of Patent: Oct. 23, 2018

(54) METHOD FOR MONITORING A MOTOR VEHICLE

(71) Applicant: Robert Bosch GmbH, Stuttgart (DE)

(72) Inventors: Evgeniya Ballmann, Stuttgart (DE); Bernd Mueller, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 32 days.

(21) Appl. No.: 15/155,948

(22) Filed: May 16, 2016

(65) Prior Publication Data

US 2016/0339926 A1   Nov. 24, 2016

(30) Foreign Application Priority Data

May 20, 2015  (DE) .................. 10 2015 209 229

(51) Int. Cl.
*B60W 50/02*    (2012.01)
*B60W 50/04*    (2006.01)

(52) U.S. Cl.
CPC ... *B60W 50/0205* (2013.01); *B60W 2050/021* (2013.01); *B60W 2050/046* (2013.01); *B60W 2520/10* (2013.01); *B60W 2520/105* (2013.01)

(58) Field of Classification Search
CPC ....... B60W 50/0205; B60W 2520/105; B60W 2520/10; B60W 2050/021; B60W 2050/046
See application file for complete search history.

(56) References Cited

U.S. PATENT DOCUMENTS

| | | | | |
|---|---|---|---|---|
| 9,274,525 B1* | 3/2016 | Ferguson | ............. | G05D 1/0274 |
| 9,390,451 B1* | 7/2016 | Slusar | .................... | G06Q 40/04 |
| 9,525,700 B1* | 12/2016 | Malinowski | ........ | H04L 63/1408 |
| 2002/0016653 A1* | 2/2002 | Levine | .................. | B60K 28/16 |
| | | | | 701/1 |
| 2011/0202305 A1* | 8/2011 | Willis | .................... | G01C 21/16 |
| | | | | 702/141 |
| 2014/0107885 A1* | 4/2014 | Hagen | .................... | G07C 5/006 |
| | | | | 701/29.4 |
| 2016/0278065 A1* | 9/2016 | Kim | .................... | H04W 72/046 |

FOREIGN PATENT DOCUMENTS

| | | |
|---|---|---|
| DE | 10 2011 075 609 A1 | 11/2012 |
| EP | 1 485 598 B1 | 12/2007 |
| WO | WO 2008/141859 | 11/2008 |

* cited by examiner

*Primary Examiner* — Mary Cheung
(74) *Attorney, Agent, or Firm* — Norton Rose Fulbright US LLP; Gerard Messina

(57) ABSTRACT

A method for monitoring a motor vehicle on the basis of one or more comparison values of a variable relating to a motion of the motor vehicle which have respectively been ascertained with different, motor-vehicle-external capture devices, a functionality in the context of ascertaining the variable with motor-vehicle-internal capture device, and/or a functionality of a drive control system of the motor vehicle, being assessed on the basis of the comparison values.

18 Claims, 3 Drawing Sheets

METHOD FOR MONITORING A MOTOR VEHICLE

CROSS REFERENCE

The present application claims the benefit under 25 U.S.C. § 119 of German Patent Application No. DE 102015209229.1 filed on May 20, 2015, which is expressly incorporated herein by reference in its entirety.

FIELD

The present invention relates to a method for monitoring a motor vehicle in terms of a possible malfunction in the context of ascertaining a variable relating to a motion, and/or a possible malfunction of a drive control system.

BACKGROUND INFORMATION

Motor vehicles nowadays have an increasing number of electronically regulated systems. Monitoring is necessary in order to recognize possible malfunctions in such a system, for example in an engine controller. The purpose in this context is in particular to prevent safety-relevant instances such as unintended acceleration, unintended deceleration, or unintended transition to a standstill.

For such monitoring functions, for example, the malfunction of the engine controller can be detected on the basis of internal sensor information. This can be accomplished, for example, in a so-called three-level concept for the engine controller, in which internal vehicle variables are monitored. European Patent No. EP 1 485 598 B1, for example, describes the monitoring of a torque, and German Patent Application No. DE 10 2011 075 609 A1 describes the monitoring of an acceleration. The internal sensor information items or captured variables are plausibilized in this context.

Utilization of the internal information cannot, however, always reliably allow inference of a fault in the vehicle system. An example thereof is acceleration monitoring for the engine controller as described in German Patent Application No. DE 10 2011 075 609 A1. This monitoring function contains unknown environmental influences, for example wind or slope drag, that can distort vehicle-internal measurements of acceleration, i.e. exhibit a discrepancy between the target value and actual value. It is therefore not always possible to distinguish, on the basis of the acceleration signal, whether the detected faulty behavior allows inference of a fault in the system or of the unknown environmental conditions.

PCT Published Application No. WO 2008/141859 A2 describes, for example, a method in which a driving state of a motor vehicle, for example a transmission state of an automatic transmission, can be adjusted on the basis of environmental data such as travel route information. This does enable more efficient vehicle operation, but monitoring of a motor vehicle is not thereby possible.

It is therefore desirable to describe a maximally effective monitoring function for a motor vehicle with reference to motion variables, and to avoid the disadvantages of purely internal monitoring.

SUMMARY

A method according to an example embodiment of the present invention serves for monitoring of a motor vehicle on the basis of one or more comparison values of a variable relating to a motion of the motor vehicle, in particular a speed or an acceleration, which have respectively been ascertained with different, motor-vehicle-external capture means. On the basis of the comparison values, a functionality in the context of ascertaining the variable with motor-vehicle-internal capture means, and/or a functionality of a drive control system of the motor vehicle, are assessed. Ascertainment of the variable with the motor-vehicle-internal capture means encompasses, for example, a capture of the variable by way of a sensor and an evaluation of data captured by the sensor, and/or an ascertainment of the variable by way of a model.

The comparison values can be ascertained, for example, as a concrete measured value. They can also, however, be ascertained as a value that is processed, e.g., averaged or filtered, over a suitable time span, in order to reduce any measurement inaccuracies.

When values are compared with one another, they should if possible be ascertained at the same point in time or at least in overlapping time windows in order to achieve good comparability of the two values. If this is not the case, models can be used in order to extrapolate or interpolate the corresponding values.

With the example method according to the present invention, an internal functionality of a motor vehicle is therefore assessed on the basis of externally ascertained comparison values of a variable. A check of internally ascertained values can occur here, for example. In addition, for example if the motor-vehicle-internal values for the variable are not available for whatever reason, the externally ascertained comparison values can also be utilized in order to check the functionality of a drive control system. If enough valid external comparison values are available, it is possible to continue to operate the drive control system. A shutdown is then not obligatorily necessary despite an absence of internal values.

The number of comparison values that are to be ascertained and are utilized, or are compared with one another, in order to assess the functionality can vary. For a comparison with internal values, for example, one comparison value can be sufficient. When internal values are absent, however, i.e., when the comparison values are used as a substitute for the internal values, it is useful if many comparison values are ascertained.

The "functionality in the context of ascertaining the variable" with the motor-vehicle-internal capture means is to be understood in the context of the present invention as the functionality of all apparatuses and sequences participating in ascertainment of the variable. These include, for example, sensors, leads, control units including installed electronics, or also algorithms and models that are used.

Advantageously the motor-vehicle-external capture means encompass capture means in at least one further motor vehicle that in particular is located in the vicinity of the motor vehicle, and/or in at least one, in particular stationary, traffic monitoring apparatus. Motor vehicles nowadays have so-called "driver assistance" systems with which, for example, the distance from a preceding vehicle can be ascertained. In combination with internal capture means (for example, for speed), the speed of a preceding or passed motor vehicle can be ascertained. Traffic monitoring cameras, for example, can also be used, for example, to ascertain the speed of a vehicle driving past the camera. External comparison values for values ascertained internally in the motor vehicle can thereby be ascertained. The externally ascertained values can be conveyed, for example, in the context of a "car-to-car" or "car-to-X" communication, and then processed.

It is advantageous if one or more value pairs, which each encompass one of the comparison values and one internal value corresponding to the comparison values, are ascertained, the internal values having been ascertained with the same, motor-vehicle-internal capture means, and the functionality in the context of ascertaining the variable with the motor-vehicle-internal capture means and/or the functionality of the drive control system of the motor vehicle being assessed as a function of an agreement in the context of the ascertained value pairs between the internal values and the associated comparison values.

What occurs here is therefore that values of a variable which are ascertained internally in a motor vehicle are compared with externally ascertained comparison values of that variable. Also critical here is the fact that in each case one of the two values of a value pair, specifically always the internal value, is ascertained by the same, motor-vehicle-internal capture means, whereas conversely the comparison value is respectively ascertained by different capture means. "Different capture means" can be understood here as different types of capture means, for example radar or camera, and/or different carriers of capture means, for example a passenger car, commercial vehicle, or traffic signal. The internal values ascertained by the same capture means can thereby be compared with comparison values that are corresponding but are ascertained by many different other capture means. The functionality of the corresponding capture means in the motor vehicle can thus be correctly assessed with a high probability.

Here as well, the number of external values to be ascertained, and to be utilized for comparison with the internal values, can vary. Even one external value can be sufficient for comparison with the internal values. It can also be important in this context that the values are time-synchronous. On the one hand, for example, the probability that a motor-vehicle-internal capture means incorrectly ascertains both of the values ascertained by it is higher than that two different other capture means are incorrectly ascertaining their respective values (because of the independence of the capture means). On the other hand, a trustworthiness of the ascertained external comparison values depends on the quality and performance of the systems that are present in the external capture means. The result is that the accuracy of those values can vary greatly. The principle is as follows: the more external comparison values that are ascertained, the greater the probability that the information from external sources is trustworthy. A greater number of value pairs should preferably be used in order to achieve a correspondingly high level of significance. A specific number greatly depends, however, on the trustworthiness of the external sources or capture means.

This furthermore makes possible an assessment of functionality, i.e., monitoring, of the drive control system, which can encompass, e.g., an engine control unit and fuel injection apparatuses. For example, if an acceleration is ascertained which is higher than is intended to be reached by way of a torque specification or acceleration specification, it is then possible to ascertain whether that acceleration is caused by external influences such as wind, or whether it is the consequence of a malfunction in the engine controller. For example, motor vehicles in the vicinity that are exposed to the wind in the same manner are reporting the same, or a similar, target/actual discrepancy in acceleration. A malfunction in the drive control system can thus, for example, be ruled out.

If the comparison value deviates from the associated internal value by less than a predefined first threshold value in at least a first number of ascertained value pairs, a malfunction in the context of ascertaining the variable with the motor-vehicle-internal capture means is preferably ruled out. The "first number" is to be understood here as a minimum number of value pairs, having agreeing internal values and comparison values, above which a functionality (in the sense of passing a test) can be assumed with sufficiently high probability. The first number can be selected, for example depending on the number of ascertained value pairs, in such a way that the trustworthiness of the external values can be guaranteed. Depending on the situation, even one value pair can be sufficient for this. For example, the first number can be equal to 50% of the number of value pairs. Additionally, however, an absolute minimum number can, for example, also be defined. For example, at least two detected agreements are necessary so that a malfunction can be ruled out at all with a probability of more than 50%. Depending on the sensor used, for example, the first threshold value can be correspondingly selected so as to accommodate any measurement inaccuracies. The first threshold can moreover be selected to be the same, or also different, upward and downward. An adaptation over the service life of the sensor is likewise conceivable.

It is advantageous if an adaptation of the ascertainment of the variable with the motor-vehicle-internal capture means is subsequently accomplished. If it is detected that the ascertainment of the value is within the predefined limits, a slight deviation, for example an absolute and/or relative drift, can therefore nevertheless exist. This can be due, for example, to aging of the sensor. The calculation of the variable with the motor-vehicle-internal capture means can then be adapted on the basis of the comparison values, i.e., the drift can be corrected.

A malfunction in the drive control system of the motor vehicle is preferably assessed when a malfunction in the context of ascertaining the variable with the motor-vehicle-internal capture means is ruled out. The monitoring of the drive control system thus occurs only if the functionality of the internal ascertainment of the variable is securely established.

If the comparison value deviates from the associated internal value by more than a predefined second threshold value in at most a second number of ascertained value pairs, a malfunction in the context of ascertaining the variable with those capture means by which the discrepant comparison values were ascertained is advantageously inferred. The "second number" can be understood here as a maximum number of value pairs up to which discrepancies in the value pairs are allowed to exist without thereby negatively affecting the assessment of functionality based on the first number. The second number is preferably selected to be small, for example one or two. In a context of 100 value pairs, for example, a discrepancy between value and comparison value is allowed to occur in only one value pair. This means that the capture means by which all the values were ascertained does not exhibit a malfunction. This also means, however, that the capture means by which the discrepant comparison value was ascertained does exhibit a malfunction, since the pertinent value derives from functional capture means and is thus assumed to be correct. In this instance the vehicle that has the defective capture means can, for example, be correspondingly informed, and suitable measures can be taken in the relevant motor vehicle.

If the comparison value deviates by more than a predefined third threshold value, in particular upward or downward, from the associated internal value in at least a third number of ascertained value pairs, a malfunction in the context of ascertaining the variable with the motor-vehicle-internal capture means is preferably inferred. The "third number" can therefore be understood here as a minimum number of value pairs having discrepant internal values and comparison values above which which an absence of functionality (in the sense of failing a test) can be assumed with sufficiently high probability. The third number can be selected, for example depending on the number of ascertained value pairs, in such a way that a malfunction in the motor-vehicle-internal capture means can be detected with sufficiently high probability. The third number can thus preferably be equal to 50% of the number of value pairs. In addition, however, an absolute minimum number can, for example, also be defined. For example, as already mentioned above, at least two detected discrepancies are necessary for a malfunction to be inferred at all with a probability of more than 50%. The third threshold value can be correspondingly selected, for example depending on the sensor used, so as to accommodate any measurement inaccuracies. The third threshold value can moreover be selected to be the same, or also different, upward and downward. An adaptation over the service life of the sensor is likewise conceivable.

It is advantageous if the agreement between the internal values and the associated comparison values in the context of the ascertained value pairs is checked in the motor vehicle or in a calculation unit outside the motor vehicle. In the case of checking in the motor vehicle, the required data, i.e. the values ascertained by other motor vehicles and/or by traffic monitoring apparatuses, can be conveyed to the motor vehicle in the manner of a car-to-car or car-to-X communication. All necessary comparisons and calculations can then be carried out directly in the motor vehicle. Any measures can likewise be initiated directly. In the case of checking in a calculation unit outside the motor vehicle, all the required data, i.e., the values ascertained by other motor vehicles and/or by traffic monitoring apparatuses as well as the values ascertained in the motor vehicle itself, can be conveyed to the external calculation unit in the manner of a car-to-X communication. The motor vehicle is thereby less burdened and, for example, is informed of a malfunction only in the event that one is detected.

Advantageously, if a malfunction in the context of ascertaining the variable with the motor-vehicle-internal capture means is inferred, an internal monitoring of the variable, a warning, and/or a changeover to a fallback level are effected. The motor vehicle can, for example, check an internal functionality, i.e., for example an internal monitoring function can be started if it was not yet active. If the internal monitoring function runs continuously, then if the malfunction is suspected it is then also possible, for example, to switch over to an alternative internal monitoring function. The data of further traffic participants can furthermore be used for plausibilization. For example, if the data of three traffic participants is not plausible, the data from the next three traffic participants can then be evaluated. With a large number of external measurements, however, i.e., a large number of value pairs, it is possible to rely on the information and, for example, a fault reaction can be started. A fault reaction can be, for example, a driver warning. If the evidence of a faulty internal sensor apparatus is entirely clear, for example, it is also possible to switch to a fallback level.

A malfunction can be caused, for example, by a defective sensor, a defective lead, a defective electronic component in a control unit, or also by a faulty calculation. A more detailed analysis of the malfunction can then be accomplished, for example, in the context of the internal monitoring function.

A calculation unit according to the present invention, for example a control unit of a motor vehicle, in particular a drive control unit or engine control unit, is configured to carry out, in particular by programmed execution, the steps of a method according to the present invention which are to be carried out in the motor vehicle.

Implementation of the method in the form of software is also advantageous, since this entails particularly low costs, especially when an executing control unit is also used for further purposes and is therefore present in any case. Suitable data media for furnishing the computer program are, in particular, diskettes, hard drives, flash memories, EEPROMs, CD-ROMs, DVDs, and so forth. Downloading of a program via computer networks (internet, intranet, cloud, etc.) is also possible.

Further advantages and embodiments of the present invention are evident from the description below and from the figures.

It is understood that the features described above and those explained below are usable not only in the respective combination indicated, but also in other combinations or in isolation, without departing from the scope of the present invention.

The present invention is schematically depicted in the figures on the basis of exemplifying embodiments and is described below with reference to the figures.

DETAILED DESCRIPTION OF EXAMPLE EMBODIMENTS

Figure 1A:
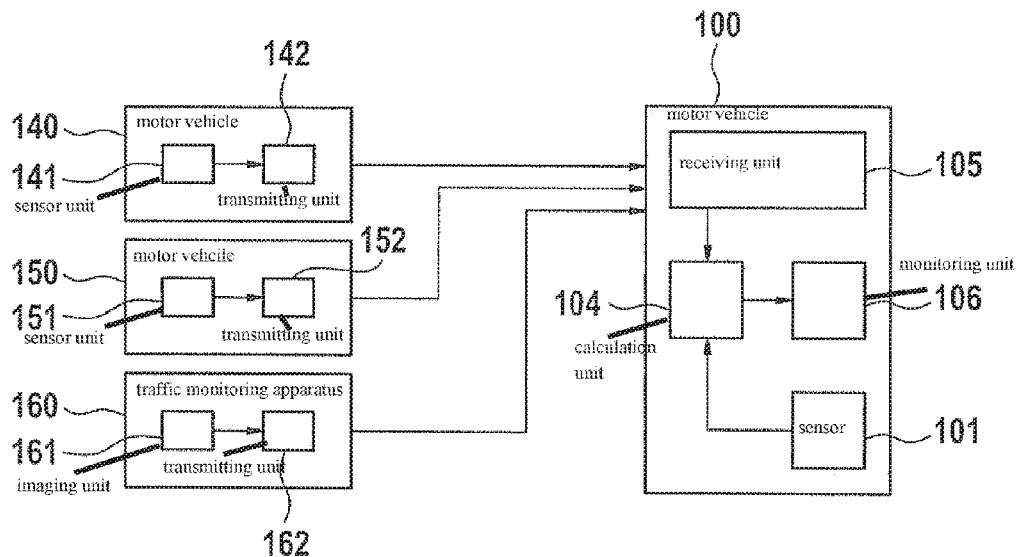
FIG. 1a schematically shows, in a block diagram, a method according to the present invention in a preferred embodiment.

FIG. 1a schematically depicts, in a block diagram, a method according to the present invention in a preferred embodiment. A motor vehicle 100 has for that purpose, for example, a sensor unit 101 with which internal values for a variable relating to a motion, for example a speed, of motor vehicle 100 are captured or ascertained.

Motor vehicle 100 furthermore has an internal calculation unit 104 to which the internal speed values captured by sensor 101 are conveyed. Values ascertained externally and conveyed to motor vehicle 100 can be received by way of a receiving unit 105 in motor vehicle 100. The external, received values are then conveyed to internal calculation unit 104.

Also depicted by way of example are two further motor vehicles 140 and 150 that each have a respective sensor unit 141 and 151 and a transmitting unit 142 and 152. The respective sensor units 141 and 151 can involve, for example, driver assistance systems, for example an adaptive cruise control (ACC), which can capture the states of other motor vehicles, for example their speed or acceleration. Such systems are usually designed according to corresponding safety levels (ASIL), i.e., the variables that they ascertain meet specific ASIL requirements.

Generally, these systems capture only the state of the motor vehicle in which they are installed. Their functionality can, however, also be expanded so that the state of another motor vehicle in the vicinity, for example of a preceding or passing motor vehicle, can be captured. This can be done, for example, by combining an internally ascertained speed and an ascertained distance to the other motor vehicle.

The values ascertained by the respective sensor units 141 and 151 are conveyed to the respectively associated transmitting unit 142 and 152, by way of which they are in turn conveyed to motor vehicle 100 or to its receiving unit 105.

Also shown by way of example is a traffic monitoring apparatus 160, for example a camera that is mounted on a traffic signal. From the data of an imaging unit 161 of the camera, the speed of an approaching motor vehicle, for example of motor vehicle 100, can be ascertained. The speed of motor vehicle 100 can be conveyed, via a transmitting unit 162 likewise integrated e.g. into camera 160, to motor vehicle 100 or to its receiving unit 105.

Transmitting units 142, 152, and 162 are preferably designed for security and for protection from manipulation. Conveyance of the values to motor vehicle 100 or to its receiving unit 105 can be accomplished, for example, by way of a secured wireless communication interface that is designed for the exchange of information between motor vehicles, for example WLAN or LTE. The security of the transfer can be ensured, for example, with a CRC code.

Receiving unit 105, by way of which the values are received from the other motor vehicles 140 and 150 or from traffic monitoring apparatus 160, is usefully also secured and protected from manipulation.

In internal calculation unit 102, the values obtained can be collected and can be compared or plausibilized with the internal values of motor vehicle 100. The result can then optionally be forwarded to a monitoring unit 106 in motor vehicle 100, by way of which unit, for example, a fault reaction is activated. For a more detailed description of this comparison of the internal and external values, reference may be made at this juncture to FIGS. 2 and 3 and the description thereof.

Figure 1B:
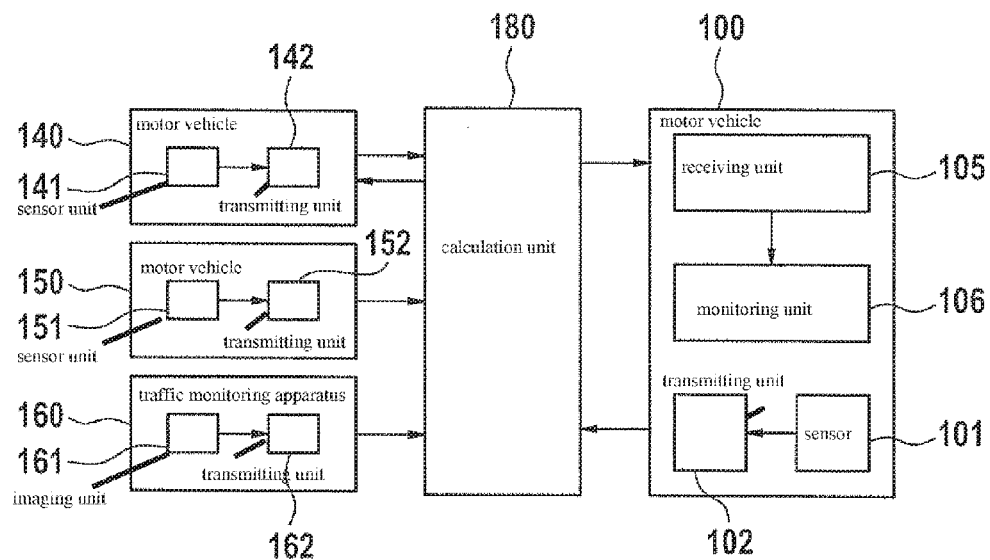
FIG. 1b schematically shows, in a block diagram, a method according to the present invention in a further preferred embodiment.

FIG. 1b schematically depicts, in a block diagram, a method according to the present invention in a further preferred embodiment. The difference with respect to the embodiment shown in FIG. 1a is that the internal values ascertained by sensor unit 101 are conveyed not to an internal calculation unit but instead firstly to a transmitting unit 102 by way of which the values are in turn conveyed to an external calculation unit 180.

The externally ascertained values of motor vehicles 140 and 150 and of traffic monitoring apparatus 160 are likewise conveyed not to motor vehicle 100 but instead to external calculation unit 180.

In external calculation unit 180, the external values that are obtained from motor vehicles 140 and 150 and from traffic monitoring apparatus 160 can be collected and can be compared or plausibilized with the internal values of motor vehicle 100. The result can then optionally be conveyed to receiving unit 105 of motor vehicle 100, from which it is forwarded to monitoring unit 106. The comparison between internal and external values can be accomplished in external calculation unit 180 in the same manner as in internal calculation unit 104. Vehicle 100 can, however, be less burdened as a result.

Also in external calculation unit 180, for example, an identification of motor vehicle 100 to which the values refer can be carried out, the communication volume can be limited, or the switching on or off of participants can be carried out. These steps, optionally with the exception of identification, can also be carried out in internal calculation unit 102.

Figure 2:
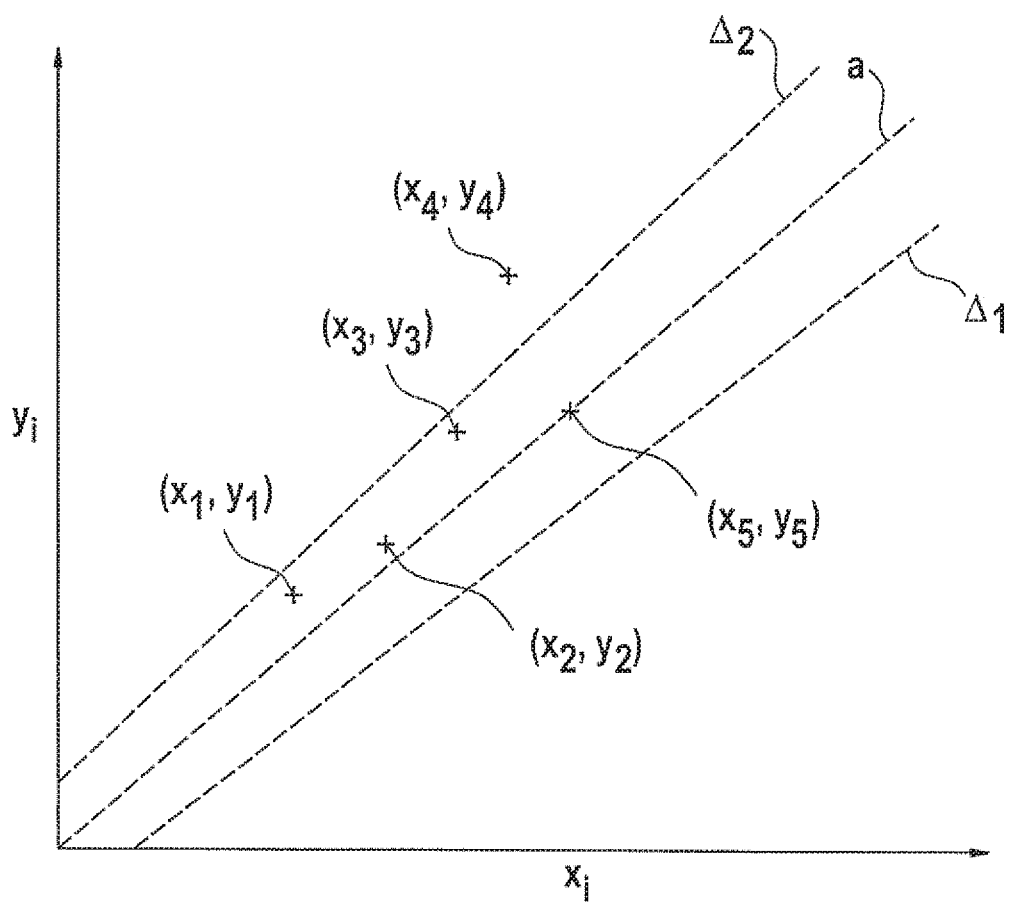
FIG. 2 shows, by way of example, value pairs ascertained in the context of a method according to the present invention.

FIG. 2 depicts in a diagram, by way of example, five value pairs $x_i$, $y_i$ (where i equals 1 to 5) that can occur in a method according to the present invention. The $x_i$ values are plotted along the abscissa and the $y_i$ values along the ordinate.

The $x_i$ values can be, for example, values that are ascertained by motor vehicle 100. The $y_i$ values are then correspondingly the comparison values that are respectively ascertained or captured by different, further motor vehicles and/or traffic monitoring apparatuses. These can include, for example, motor vehicles 140 and 150, as well as traffic monitoring apparatus 160, shown in FIGS. 1a and 1b.

In the context of ascertainment of these value pairs, care should be taken that only value pairs having mutually corresponding values and comparison values are created. In other words, for example, the speed of motor vehicle 100 ascertained internally (value) and externally (comparison value) must have occurred at the same, or at least at approximately the same, point in time, or can be interpolated or extrapolated with sufficient accuracy to that point in time. The values can, for example, be provided with time stamps for that purpose.

Line a describes value pairs $x_i$, $y_i$ for which the comparison values $y_i$ do not deviate from the associated internal value $x_i$. In other words, $x_i = y_i$ for value pairs that are located on line a. For value pairs located below line a, the comparison value $y_i$ deviates downward from the associated internal value $x_i$; for value pairs located above line a, the comparison value $y_i$ deviates upward from the associated internal value $x_i$.

A certain tolerance threshold can also be included, however, in the context of checking with regard to an agreement or discrepancy between mutually corresponding values and comparison values of a value pair, for example in order to account for any measurement inaccuracies. For example, a discrepancy between value and comparison value can be recognized as relevant only if the value pair is no longer located between lines $\Delta_1$ and $\Delta_2$, constituting a lower and an upper tolerance threshold. These tolerance thresholds can have, as necessary, an absolute and a relative component and can also be identical or different for an upward and downward discrepancy.

In the example shown in FIG. 2, for example, the value pairs where i=1, 2, 3, 5 are located within the tolerance thresholds, i.e. here the comparison values deviate from the respectively associated value by less than a first threshold value that is defined in the present case by the lines $\Delta_1$ and $\Delta_2$. The value pair where i=4, on the other hand, is located outside the tolerance thresholds, i.e. here the comparison value $y_4$ deviates from the value $x_4$ by more than a second threshold value that is likewise defined in the present case by the lines $\Delta_1$ and $\Delta_2$.

Figure 3:
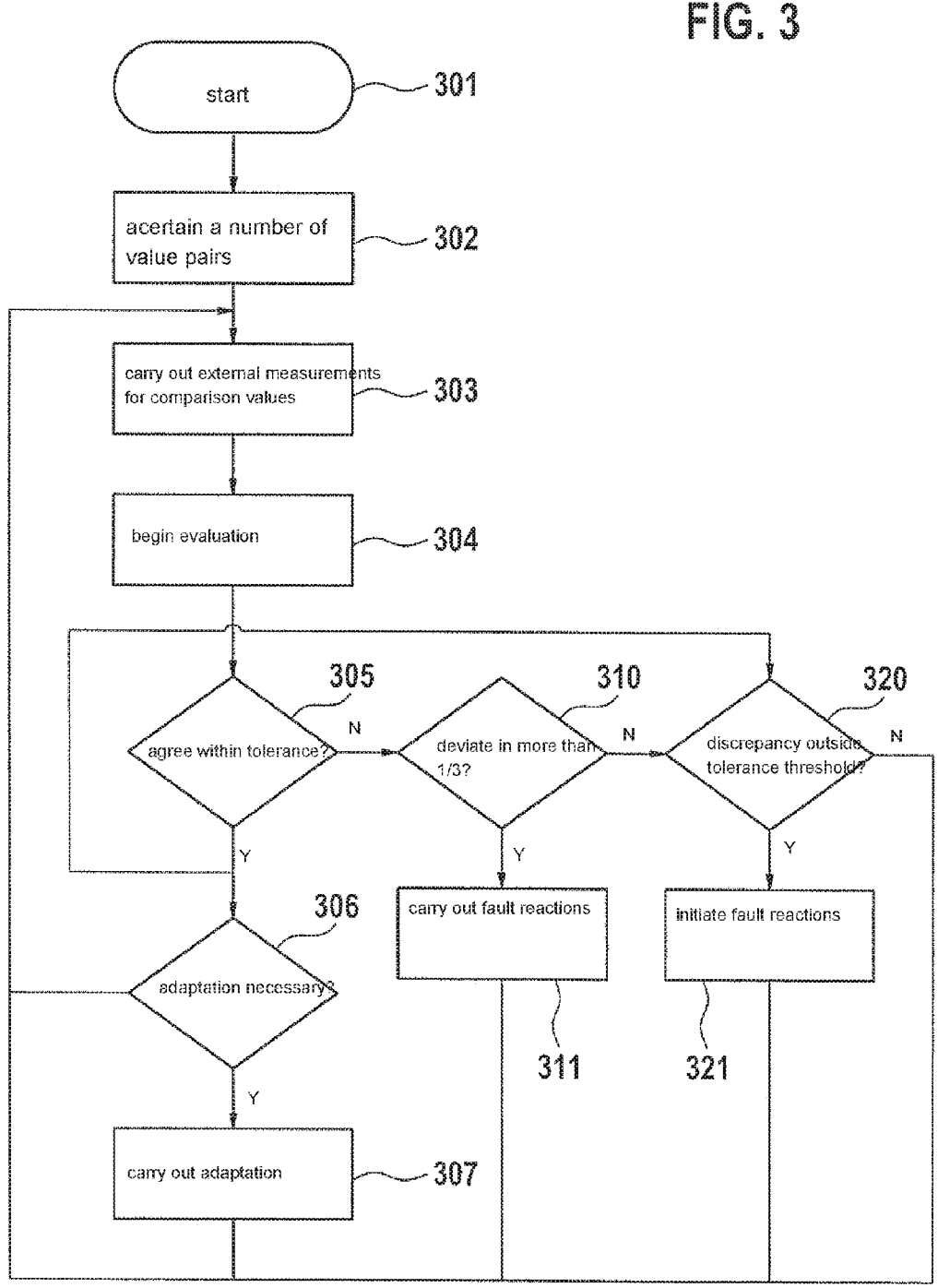
FIG. 3 schematically shows the execution of a method according to the present invention in a further preferred embodiment.

FIG. 3 schematically shows the sequence of a method according to the present invention in a further preferred embodiment. After a starting step 301, in a step 302 firstly a number of value pairs to be ascertained is defined. The number of value pairs to be ascertained can preferably be, for example, 100. A first number and a third number are furthermore defined in this step 302.

The first number indicates the minimum number of value pairs, of the ascertained value pairs, in which the internal value and the associated comparison value are to agree in the context of the tolerance threshold, or in which the comparison value is to deviate from the associated internal value by less than a first threshold value, in order to rule out a malfunction in the context of ascertaining the relevant variable, for example a speed, in the relevant motor vehicle.

The third number indicates the minimum number of value pairs, of the ascertained value pairs, in which the internal value and the associated comparison value are to differ from one another in the context of the tolerance threshold, or in which the comparison value is to deviate from the associated internal value by more than a second threshold value, in order to detect a malfunction in the context of ascertaining the relevant variable, for example the speed, in the relevant motor vehicle. The third number can be defined for all discrepancies, i.e. upward and downward together. It is also conceivable, however, for the upward and downward discrepancies to differ.

In a step 303 a total first number of external measurements for comparison values is carried out, for example by way of capture means in other motor vehicles and/or traffic monitoring apparatuses, and is stored in an internal or external calculation unit depending on the embodiment. It must be ensured in this context that external values, i.e., comparison values, derive in each case from different sources. In addition, a value is ascertained internally for each comparison value and is stored together with the associated comparison value in the manner of a value pair.

Usefully, the respective source of the external values is also stored so that it is possible to ensure that the sources are different. In addition, information regarding the time of capture of the values can be stored in order to simplify the ascertainment of the value pairs, i.e., the association of internal values and comparison values with one another. This can be accomplished, for example, via an explicit time stamp or via an implicit time window. It is thereby possible to ensure that only values which refer to the same time are compared.

Once the first number of value pairs is reached, an evaluation of those value pairs can begin in a step 304. For this, firstly a step 305 checks whether, in more than the defined first number of value pairs, the internal value and the associated comparison value agree within the tolerance threshold.

If the internal value and the associated comparison value agree, within the tolerance threshold, in more than the first number of value pairs, a malfunction in the context of ascertaining the relevant variable is ruled out. A step 306 then checks whether an adaptation in ascertaining of the variable is necessary. This can be the case, for example, if the internal values and the associated comparison values agree within the tolerance threshold but the discrepancies are located very close to the tolerance threshold. An adaptation can be accomplished, for example, by way of an adaptation in the processing of a sensor value or by way of a change in a model or a calculation algorithm.

If an adaptation is necessary, then in a step 307 the corresponding adaptation is carried out. The method is then repeated starting at step 303. If no adaptation is necessary, the method is likewise repeated starting at step 303.

If it is found in step 305 that no more than the first number of value pairs exhibit an agreement of the internal value and associated comparison value within the tolerance threshold, a step 310 checks whether the internal value and associated comparison value deviate from one another outside the tolerance threshold in more than the third number of value pairs.

If the internal value and associated comparison value differ from one another outside the tolerance threshold in more than the third number of value pairs, a malfunction in the context of ascertaining the variable in the relevant motor vehicle is detected. This can signify, for example, a defect in a sensor. Corresponding fault reactions can then be carried out in a step 311. The method can then, if desired, be repeated starting at step 303.

If the internal value and the associated comparison value deviate from one another outside the tolerance threshold in more than the third number of value pairs, a step 320 checks whether, in at most a second number of value pairs, a discrepancy outside the tolerance threshold exists between the internal value and associated comparison value.

If this is the case, it is inferred that a malfunction exists in those motor vehicles by which the discrepant comparison values were ascertained. In a step 321 the corresponding motor vehicles can then optionally be correspondingly informed so that fault reactions can be initiated therein. Then, or if a discrepancy between the internal value and associated comparison value outside the tolerance threshold is not present in at most a second number of value pairs, the method is repeated starting at step 303. Steps 320 and 321 can also occur when a malfunction is ruled out in step 305. In this case steps 320 and 321 are performed in addition to step 308.

If a malfunction cannot be either ruled out or detected with sufficient probability, the number of value pairs can then be increased. Another check can then be carried out.

What is claimed is:

1. A method for monitoring a motor vehicle, the method comprising:
receiving comparison values of a variable relating to a motion of the motor vehicle which have been ascertained with at least one capture device external to the motor vehicle, the at least one capture device located at least one of: in at least one further motor vehicle that is located in the vicinity of the motor vehicle, or on at least one stationary traffic monitoring apparatus; the variable relating to the motion including at least one of: a speed of the motor vehicle, or an acceleration of the motor vehicle;
receiving values of the variable relating to the motion of the motor vehicle which have been ascertained using at least one capture device internal to the motor vehicle; and
assessing, based on a comparison of the comparison values of the variable and the values of the variable, at least one of: a functionality in the context of ascertaining the variable with the at least one capture device internal to the motor vehicle, or a functionality of a drive control system of the motor vehicle;
wherein at least one value pair which each encompass one of the comparison values and one internal value corresponding to the comparison values, are ascertained, the internal values having been ascertained with the same, motor-vehicle-internal capture device, and the at least one of the functionality in the context of ascertaining the variable with the motor-vehicle-internal capture device, and the functionality of the drive control system of the motor vehicle, being assessed as a function of an agreement between the internal values and the associated comparison values in the context of the ascertained value pairs.

2. The method as recited in claim 1, wherein a malfunction in the context of ascertaining the variable with the motor-vehicle-internal capture device is ruled out if the comparison value deviates from the associated internal value by less than a predefined first threshold value in at least a first number of ascertained value pairs.

3. The method as recited in claim 2, wherein an adaptation of the ascertainment of the variable with the motor-vehicle-internal capture device is subsequently accomplished.

4. The method as recited in claim 2, wherein a functionality of the drive control system of the motor vehicle is assessed when a malfunction in the context of ascertaining the variable with the motor-vehicle-internal capture device is ruled out.

5. The method as recited in claim 1, wherein a malfunction in the context of ascertaining the variable with those capture devices by which discrepant comparison values were ascertained being inferred if the comparison value deviates from the associated internal value by more than a predefined second threshold value in at most a second number of ascertained value pairs.

6. The method as recited in claim 1, wherein a malfunction in the context of ascertainment with the motor-vehicle-internal capture means is inferred if the comparison value deviates by more than a predefined third threshold value from the associated internal value in at least a third number of ascertained value pairs.

7. The method as recited in claim 6, wherein at least one of: an internal monitoring of the variable, a warning, and a changeover to a fallback level, is effected if a malfunction in the context of ascertaining the variable with the motor-vehicle-internal capture means is inferred.

8. The method as recited in claim 1, wherein agreement between the internal values and the associated comparison values in the ascertained value pairs are checked one of: i) in the motor vehicle, or ii) in a calculation unit outside the motor vehicle.

9. The method as recited in claim 1, wherein the variable relating to a motion encompasses one of a speed or an acceleration.

10. The method as recited in claim 1, wherein the ascertainment of the variable with the motor-vehicle-internal capture device encompasses at least one of: i) a capture of the variable by way of a sensor and an evaluation of the data captured by the sensor, and ii) an ascertainment of the variable by way of a model.

11. The method as recited in claim 1, further comprising determining, based on the assessing, a malfunction of the functionality in the context of ascertaining the variable with—the at least one—capture device internal to the motor vehicle.

12. The method as recited in claim 1, further comprising initiating, based on the assessing, at least one of: adapting of the ascertaining of the values using the at least one capture device internal to the motor vehicle, monitoring of the at least one variable internally to the motor vehicle, or providing of a warning indication to a driver of the motor vehicle.

13. The method as recited in claim 1, further comprising initiating, based on the assessing, an adapting of the ascertaining of the values using the at least one capture device internal to the motor vehicle.

14. The method as recited in claim 1, further comprising initiating, based on the assessing, monitoring of the at least one variable internally to the motor vehicle.

15. The method as recited in claim 1, further comprising initiating, based on the assessing, providing of a warning indication to a driver of the motor vehicle.

16. The method as recited in claim 1, wherein the at least one capture device external to the motor vehicle and the at least one capture device internal to the motor vehicle are different capture device types.

17. A control unit that is configured to monitor a motor vehicle, the control unit comprising:
  a processing unit; and
  a non-transitory machine-readable storage medium storing program instructions, which when executed on the processing unit cause the processing unit to perform a method of monitoring a motor vehicle, the method including:
    receiving comparison values of a variable relating to a motion of the motor vehicle which have been ascertained with at least one capture device external to the motor vehicle, the at least one capture device located at least one of: in at least one further motor vehicle that is located in the vicinity of the motor vehicle, or on at least one stationary traffic monitoring apparatus; the variable relating to the motion including at least one of: a speed of the motor vehicle, or an acceleration of the motor vehicle;
    receiving values of the variable relating to the motion of the motor vehicle which have been ascertained using at least one capture device internal to the motor vehicle;
    assessing, based on a comparison of the comparison values of the variable and the values of the variable, at least one of: a functionality in the context of ascertaining the variable with the at least one capture device internal to the motor vehicle, or a functionality of a drive control system of the motor vehicle;
    wherein at least one value pair which each encompass one of the comparison values and one internal value corresponding to the comparison values, are ascertained, the internal values having been ascertained with the same, motor-vehicle-internal capture device, and the at least one of the functionality in the context of ascertaining the variable with the motor-vehicle-internal capture device, and the functionality of the drive control system of the motor vehicle, being assessed as a function of an agreement between the internal values and the associated comparison values in the context of the ascertained value pairs.

18. A non-transitory machine-readable storage medium storing program instructions, which when executed on a processing unit cause the processing unit to perform a method of monitoring a motor vehicle, the method comprising:
  receiving comparison values of a variable relating to a motion of the motor vehicle which have been ascertained with at least one capture device external to the motor vehicle, the at least one capture device located at least one of: in at least one further motor vehicle that is located in the vicinity of the motor vehicle, or on at least one stationary traffic monitoring apparatus; the variable relating to the motion including at least one of: a speed of the motor vehicle, or an acceleration of the motor vehicle;

receiving values of the variable relating to the motion of the motor vehicle which have been ascertained using at least one capture device internal to the motor vehicle;

assessing, based on a comparison of the comparison values of the variable and the values of the variable, at least one of: a functionality in the context of ascertaining the variable using the at least one capture device internal to the motor vehicle, or a functionality of a drive control system of the motor vehicle;

wherein at least one value pair which each encompass one of the comparison values and one internal value corresponding to the comparison values, are ascertained, the internal values having been ascertained with the same, motor-vehicle-internal capture device, and the at least one of the functionality in the context of ascertaining the variable with the motor-vehicle-internal capture device, and the functionality of the drive control system of the motor vehicle, being assessed as a function of an agreement between the internal values and the associated comparison values in the context of the ascertained value pairs.

* * * * *